United States Patent [19]

Graham, Jr. et al.

[11] 4,077,718

[45] Mar. 7, 1978

[54] RECEIVER FOR OPTICAL RADAR

[75] Inventors: Robert T. Graham, Jr., Wilmington; Robert M. Stevens, Littleton, both of Mass.; Kenneth F. Kinnard, Morristown, N.J.

[73] Assignee: Raytheon Company, Lexington, Mass.

[21] Appl. No.: 662,393

[22] Filed: Mar. 1, 1976

[51] Int. Cl.² ............................................... G01C 3/08
[52] U.S. Cl. ...................................... 356/4; 250/552; 356/5; 356/28
[58] Field of Search ............................... 356/4, 5, 28; 250/211 J, 552

[56] References Cited

U.S. PATENT DOCUMENTS

| | | | |
|---|---|---|---|
| 3,619,058 | 11/1971 | Hewlett et al. | 356/5 |
| 3,830,567 | 8/1974 | Riegl | 356/5 |
| 3,869,207 | 3/1975 | Hermet et al. | 356/5 |

OTHER PUBLICATIONS

Tsacoyeanes et al., *Applied Optics*, Nov. 1970, vol. 9, #11, pp. 2597-2598.

*Primary Examiner*—S. C. Buczinski
*Attorney, Agent, or Firm*—Philip J. McFarland; Joseph D. Pannone

[57] ABSTRACT

A control circuit for maintaining the sensitivity of an avalanche diode at an optimum is shown. Such diode, when used as a photosensitive detector in a receiver in an optical radar, is biased by the disclosed control circuit so that the frequency at which internally generated noise impulses are generated is maintained at a predetermined rate so that echo signals may be distinguished from such impulses.

2 Claims, 2 Drawing Figures

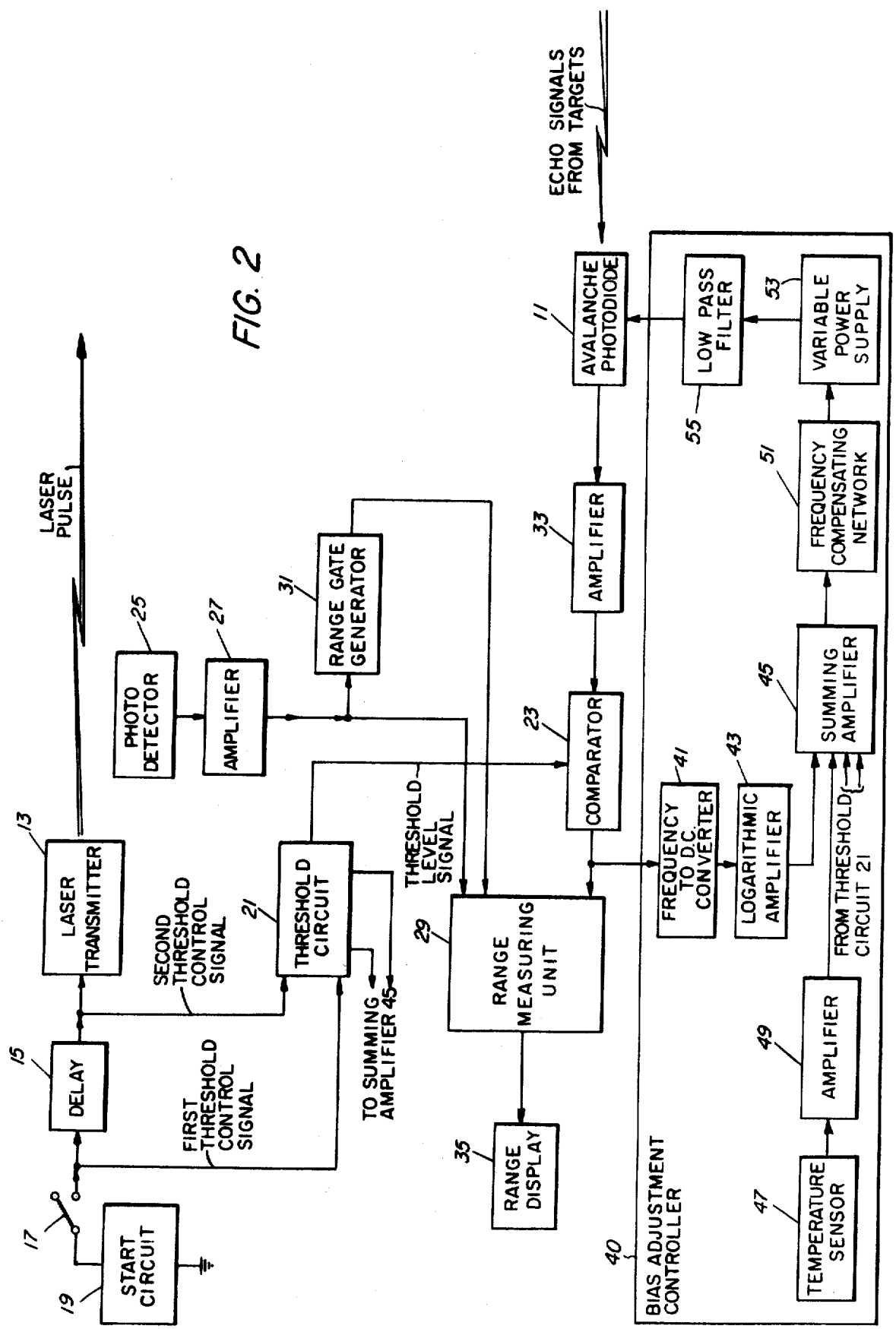

4,077,718

RECEIVER FOR OPTICAL RADAR

BACKGROUND OF THE INVENTION

This invention pertains generally to optical radars and particularly to optical radars which may be carried by a person and used as a rangefinder.

It is well known in the art that an optical radar may be used as a rangefinder. When, however, it is required that such a radar be compact and simple enough to be housed in a structure resembling ordinary field glasses, many problems are encountered which cannot be solved by conventional techniques. In particular, in the receiver of such a system it is not feasible to use any of the many known types of photosensitive detectors which require cryogenic cooling for satisfactory operation. Such a stricture, in turn, means that, at present, only a photomultiplier, a silicon p-i-n photodiode or a silicon avalanche photodiode (referred to hereinafter simply as an avalanche photodiode) may be used.

While the avalanche photodiode has the advantage of greater sensitivity than either a photomultiplier or a p-i-n photodiode, the characteristics of such a photodiode change radically with any change in ambient temperature or bias voltage. In particular, the amount of internally generated noise (sometimes referred to as "pop" noise) is dependent upon both ambient temperature and bias voltage. As a result, then, satisfactory operation of such a photodiode may not be achieved unless special provisions are taken to compensate for the effects induced by changes in temperature and bias voltage.

SUMMARY OF THE INVENTION

In view of the foregoing, it is a primary object of this invention to provide an improved optical radar adapted to operate as a rangefinder by using an avalanche photodiode in a receiver to convert echo signals from optical to electrical signals.

Another object of this invention is to provide, for the avalanche photodiode in an optical receiver, a bias adjustment controller which is effective to maintain the frequency of pop noise from such a photodiode at a predetermined rate, regardless of changes (within wide limits) of the ambient temperature or bias voltage.

The foregoing and other objects of this invention are attained generally by providing, in the receiver section of an optical radar used as a rangefinder, an avalanche photodiode to detect echo signals resulting from the reflection of laser pulses from a laser transmitter. In a preferred embodiment of this invention, the avalanche photodiode is biased by an arrangement which is operative, just before the laser transmitter is actuated to produce a laser pulse, to reduce the average frequency of any pop noise to a first predetermined level and which is operative at all other times to maintain the average frequency of such noise to a second predetermined rate. Under such conditions, the sensitivity of the avalanche photodiode is at an optimum so that the first output signal from such element occurring after a preselected delay may be taken to be an echo signal from a selected target and the range to such target is measured.

BRIEF DESCRIPTION OF THE DRAWINGS

For a more complete understanding of this invention, reference is now made to the following description of a preferred embodiment illustrated in the accompanying drawings, wherein:

FIG. 2 is a block diagram showing particularly a preferred biasing arrangement for a photodetector in the optical radar shown in FIG. 1.

DESCRIPTION OF THE PREFERRED EMBODIMENT

Figure 1:
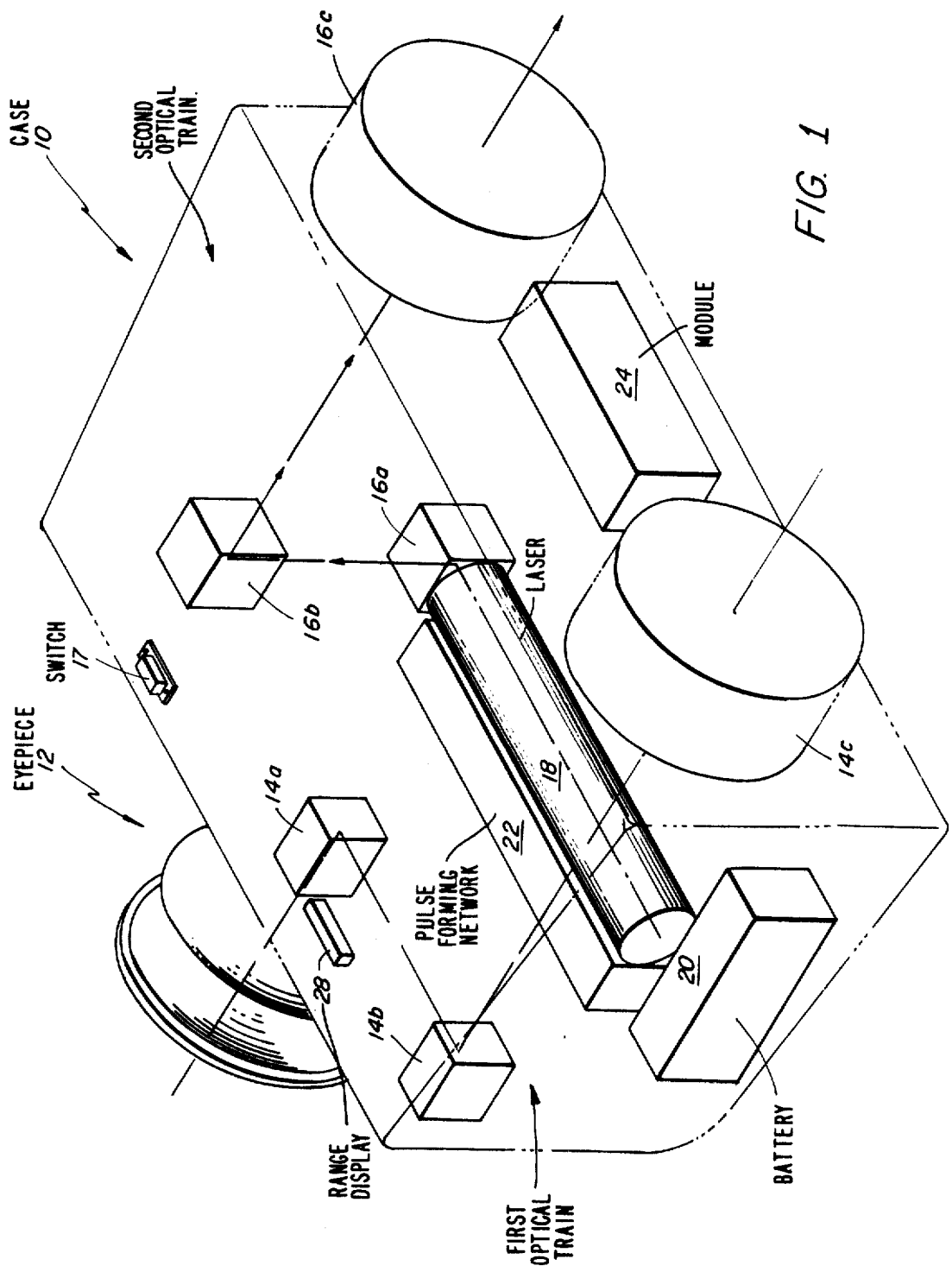
FIG. 1 is an isometric sketch showing how the elements of an optical radar incorporating this invention are disposed to form an assembly resembling conventional field glasses.

Referring now to FIG. 1, the general disposition of the elements of a rangefinder using an optical radar according to this invention within a case 10 is shown. Thus, eyepiece 12 permits the user to view, through a first optical train (shown generally by the elements marked by the numerals 14a, 14b and 14c), a scene containing any target for which the range is to be determined and to focus generally at the range of a selected target. A second optical train (shown generally by the elements marked by the numerals 16a, 16b, 16c) permits a laser pulse to be directed from a laser 18 toward the same scene as viewed through the eyepiece R. The laser 18 is actuated by energy from a battery 20, operating through a pulse forming network 22 which is charged when a switch 17 is actuated. A module 24 contains signal processing circuitry (not numbered, but described in detail in connection with FIG. 2) to detect echo signals resulting from reflection of each laser pulse. The signal processing circuitry is effective then to actuate a range display 28 (designated by the numeral 35 in FIG. 2) visible to the user through the eyepiece 12. It will be appreciated that, except for the elements making up the signal processing circuitry, the elements just mentioned are conventional.

Referring now to FIG. 2, it may be seen that the electrical circuit of the contemplated optical radar is, except for the manner in which an avalanche photodiode 11 is biased, quite conventional. Thus a laser transmitter 13 is connected, through a delay 15 and a switch 17, to a start circuit 19, so that a laser pulse may be transmitted whenever the switch 17 is actuated. The start circuit 19 may, for example, be a battery (not shown) to actuate (through the delay 15 when the switch 17 is operated) the laser transmitter 13 and to provide a first and a second threshold control signal for a threshold circuit 21. The just-mentioned circuit here is a conventional logic circuit to switch a threshold level signal from a relatively low voltage level for a short period just prior to actuation of the laser transmitter 13 to a relatively high voltage level during each reception interval. The threshold circuit 21 also, for reasons to become clear hereinafter, is here adapted to produce a first and a second reference signal for determining a first and a second pop frequency. The voltage source from which the threshold level signals and the first and the second reference signals are derived may be the battery (not shown) in the start circuit 19 or a separate battery connected through appropriate taps on a voltage divider (not shown).

When the laser transmitter 13 is actuated to transmit a laser pulse, an electrical signal in the form of a pulse is produced by a photodetector 25. The electrical signal out of the photodetector 25 is passed, through an amplifier 27, to a range measuring unit 29 and to a range gate generator 31. The latter may, for example, include a variable delay (not shown) and a unistable multivibrator (not shown). It will be appreciated that such an arrangement may be adjusted so that, during a predetermined interval occurring at a predetermined time after transmission of the laser pulse, the unistable multivibrator may be caused to be in its astable condition. It will further be appreciated that the output signal from the range gate generator 31 may be taken (when the unistable multivibrator is in its astable condition) to be a range gate.

The range measuring unit 29 here consists of logical circuitry adapted to allow clock pulses from a clock pulse generator (not shown) to be passed to a counter (not shown) starting when the electrical signal out of the amplifier 27 indicates transmission of a laser pulse and ending when the outputs of the comparator 23 (a pulse occurring whenever the output of the avalanche photodiode 11, after amplification in an amplifier 33, exceeds the level of the threshold level signal) and the range gate generator 31 indicate the probable reception of an echo signal from a target within a preselected range interval. The contents of the counter in the range measuring unit 29 at the time clock pulses are inhibited to constitute a measure of range of the target. Such contents are decoded by a conventional decoding matrix (not shown) to actuate a display 35 (here matrix of light emitting diodes) thereby presenting a human readable indication of range.

Before explanation of the contemplated preferred embodiment of a bias adjustment controller 40 is undertaken, the nature and causes of the anomalous and undesirable effects, i.e. Gaussian noise and pop noise will be made. Thus, the source of noise of a Gaussian nature may be considered to be the amplifier 33. It will be appreciated that the amount of noise attributable to the amplifier 33 may be reduced to an acceptable level by following conventional techniques. That is to say, the bandwidth and gain of the amplifier 33 may be kept as narrow and low as possible (always keeping in mind the requirements imposed to amplify echo signals). The threshold level signal into the comparator 23 then may be set so that the noise attributable to the amplifier 33 has no significant effect on operation.

The second source of noise here is the avalanche diode 11. While such a device generates a small amount of Gaussian noise, the effect of such noise may be eliminated in the same way as Gaussian noise arising in the amplifier 33. In addition, however, pop noise (hereinafter referred to as "pop impulses") due to field emission effects within the avalanche photodiode 11 itself occur. While there is now little agreement among persons of skill in the art concerning the phenomena causing pop impulses, there is no doubt that: (a) the amplitudes of many individual pop impulses are greater than the amplitude of almost every Gaussian noise impulse; (b) the amplitude of many individual pop impulses is in the same order as the amplitude of echo signals; and (c) the frequency (meaning the average rate of occurrence) of pop impulses is a function of ambient temperature and the bias voltage on the avalanche photodiode 11. Fortunately, however, at any given ambient temperature and with any given threshold level signal, the frequency of pop impulses may be precisely controlled by adjustment of the bias voltage on the avalanche photodiode 11. It will be appreciated, therefore, that if proper consideration of the foregoing characteristics is taken: (a) Gaussian noise impulses may, for any practical purpose, be inhibited from entering the range measuring unit 29; and (b) at any given ambient temperature and with any given threshold level signal, the frequency of pop impulses may be reduced (without a concomitant excessive reduction in sensitivity of the avalanche photodiode 11) to such a degree that any signal out of the comparator 23 during any range gate is far more likely to have resulted from reception of an echo signal than from a pop impulse.

With the foregoing in mind it is obvious that the comparator 23 may be operated in a conventional fashion to eliminate, for all practical purposes, any Gaussian noise out of the amplifier 33. That is to say, the amplitude of the threshold level signal is maintained at such a level that only rarely will any such noise be allowed to pass through that element. It may be assumed, therefore, during each interval when the threshold level signal is controlled by the first threshold control signal (i.e. when the bias of the avalanche diode is being adjusted), only pop impulses will be passed through the comparator 23. It will be noted that, although the comparator 23 may simply be a conventional differential amplifier, here that element includes means for normalizing the width of the output signals resulting from pop impulses. Such means may, for example, be a simple resistor-capacitor feedback circuit which is responsive to each pop impulse out of the comparator 23 so as to maintain, or "latch", the level of the input signal to the comparator 23 above the then existing threshold level signal for a predetermined period of time. Such latching converts each pop impulse passed through the comparator 23 to a pulse (hereinafter referred to as a pop pulse) of predetermined length. The energy in a train of such pulses is then proportional to frequency.

The normalized output, i.e. a train of pop pulses, from the comparator 23 is fed into a frequency to D.C. converter 41, here a low pass filter. The output of such converter is a D.C. signal whose amplitude is proportional to the frequency of the pop impulses passed through the comparator 23. It has been found, by experiment with various avalanche photodiodes, that the frequency of pop impulses may be caused to vary exponentially with change in bias voltage. That is to say, the bias voltage on the avalanche diode 11 may be changed to suppress pop impulses or to maintain the frequency of pop impulses at any desired frequency. Therefore, in order to provide a signal which is linearly related to the frequency of the pop impulses, the output of the frequency to D.C. converter 41 is passed through to a logarithmic amplifier 43.

The output of the logarithmic amplifier 43 is connected to a summing amplifier 45, along with the first and the second reference signal from the threshold circuit 21. The output of a temperature sensor 47, after passing through an amplifier 49, is also connected to the summing amplifier 45. The temperature sensor 47 may be any conventional element which produces an electrical signal proportional to ambient temperature. It follows, then, that the D.C. level of the output of the summing amplifier 45 is, at any given ambient temperature, proportional to the difference between the frequency of the pop impulses then being produced by the avalanche photodiode 11 and a frequency determined by the particular reference signal then being applied to summing amplifier 45. Such signal is passed through a compensating network 51 to a variable power supply 53. The latter is a conventional D.C. to D.C. converter, as, for example, the Model Q-15 manufactured by the Venus Scientific Company, Farmingdale, New York. The output of the variable power supply 53 is connected, through a low pass filter 55, to the avalanche diode 11 to bias such element.

It will now be apparent to one of skill in the art that the bias adjustment controller 40 constitutes a servo system which is adapted to maintain the frequency of pop impulses passing through the comparator 23 during any given interval at a constant value. Thus, by appropriately selecting the reference voltage and the characteristics of the various elements in the bias adjustment controller 40, the frequency of the pop impulses may be periodically adjusted and then maintained during each receiving interval of the optical radar system.

Having described a preferred embodiment of this invention, it will now be apparent to one of skill in the art that changes may be made, without departing from our inventive concepts, in the manner in which the bias voltage on the avalanche photodiode may be controlled. For example, it is not essential that the threshold level signal be changed from a lower level to a higher level during operation. If it be accepted that a relatively long time may be taken to adjust the bias on the avalanche photodiode, only a single threshold level signal approximating the higher threshold level signal need be applied to the comparator 23. The resulting pop pulses (which would then occur at a lower frequency than the frequency of the pop pulses used to adjust the bias voltage of the avalanche photodiode in the illustrated embodiment) would ultimately cause the requisite adjustment of bias voltage to be made. It will also be evident that the illustrated circuitry may be modified to allow the avalanche photodiode to detect the fact that a laser pulse has been transmitted. That is to say, it will be evident that appropriate logical circuitry could be used to permit the avalanche photodiode to perform the function of detecting transmission of each laser pulse in addition to the function of detecting echo signals. Therefore, it is felt that this invention should not be restricted to its disclosed embodiment but rather should be limited only by the spirit and scope of the appended claims.

What is claimed is:

1. In a pulsed optical radar wherein the bias voltage across an avalanche photodiode is adjusted, for a predetermined interval of time following transmission of each interrogating pulse of optical energy, substantially to inhibit the generation of noise impulses and wherein an adaptive biasing arrangement for the avalanche photodiode maintains such photodiode in an optimum condition for the detection of echo signals, such arrangement comprising:
   a. a variable power supply for providing a bias voltage, such supply being connected across the avalanche diode;
   b. pulse generating means, responsive for an interval of time prior to transmission of each interrogating pulse of optical energy to a train of noise impulses out of the avalanche photodiode, for generating a corresponding train of substantially equal pulses;
   c. conversion means, responsive to the corresponding train of substantially equal pulses, for generating a DC signal having a level proportional to the frequency of the corresponding train of substantially equal pulses; and
   d. control means for the variable power supply, such control means being responsive to the DC control signal to reduce the frequency of the noise impulses out of the avalanche photodiode to a predetermined level during the predetermined interval of time following transmission of each interrogating pulse of optical energy.

2. The adaptive biasing arrangement as in claim 1 wherein the control means for the variable power supply includes:
   a. a logarithmic amplifier, responsive to the DC signal out of the conversion means, for producing the DC control signal; and
   b. means for maintaining the level of the DC control signal during each predetermined interval of time after transmission of each interrogating pulse.

* * * * *